United States Patent
Xi et al.

(10) Patent No.: US 12,018,929 B2
(45) Date of Patent: Jun. 25, 2024

(54) NON-CONTACT KEY TOOTH PROFILE LEARNING METHOD AND SYSTEM

(71) Applicant: SHENZHEN XHORSE ELECTRONICS CO., LTD, Guangdong (CN)

(72) Inventors: Yongfeng Xi, Guangdong (CN); Yuan He, Guangdong (CN); Yijie Hao, Guangdong (CN); Guozhong Cao, Guangdong (CN); Chenglong Li, Guangdong (CN); Hui Liu, Guangdong (CN)

(73) Assignee: SHENZHEN XHORSE ELECTRONICS CO., LTD, Guangdong (CN)

( * ) Notice: Subject to any disclaimer, the term of this patent is extended or adjusted under 35 U.S.C. 154(b) by 202 days.

(21) Appl. No.: 17/432,073

(22) PCT Filed: Jun. 30, 2020

(86) PCT No.: PCT/CN2020/099442
§ 371 (c)(1),
(2) Date: Aug. 18, 2021

(87) PCT Pub. No.: WO2021/008359
PCT Pub. Date: Jan. 21, 2021

(65) Prior Publication Data
US 2022/0196392 A1    Jun. 23, 2022

(30) Foreign Application Priority Data
Jul. 16, 2019   (CN) .......................... 201910642404.3

(51) Int. Cl.
*G01B 11/24*   (2006.01)

(52) U.S. Cl.
CPC .................................... *G01B 11/24* (2013.01)

(58) Field of Classification Search
CPC ..... G01B 11/24; G01B 11/25; G01B 11/2518; G01B 5/0018; B23C 3/35
See application file for complete search history.

(56) References Cited

U.S. PATENT DOCUMENTS

| | | | | |
|---|---|---|---|---|
| 6,064,747 A  *  | 5/2000 | Wills | ........................ | B23C 3/35 |
| | | | | 382/152 |
| 6,588,995 B2 * | 7/2003 | Wills | ........................ | B23C 3/35 |
| | | | | 269/106 |

(Continued)

FOREIGN PATENT DOCUMENTS

| | | | | |
|---|---|---|---|---|
| CN | 101520319 A | 9/2009 | | |
| CN | 103759671 B  * | 5/2016 | ............. | G01B 11/24 |

(Continued)

OTHER PUBLICATIONS

"An Effective 3D Ear Acquisition System", Liu et al., PLOS ONE, 10.1371 (Year: 2015).*

(Continued)

*Primary Examiner* — Mohamed K Amara
(74) *Attorney, Agent, or Firm* — Davis Wright Tremaine LLP (57) ABSTRACT

A non-contact key tooth profile learning method and system are provided. The non-contact key tooth profile learning method comprises the following steps: acquiring first profile point cloud data of a key by means of a line laser method; and processing the first profile point cloud data so as to obtain first 3D profile information.

15 Claims, 5 Drawing Sheets

(56) References Cited

U.S. PATENT DOCUMENTS

| | | | | |
|---|---|---|---|---|
| 7,013,191 B2* | 3/2006 | Rubbert | ............... | A61C 7/12 |
| | | | | 700/118 |
| 8,923,599 B2* | 12/2014 | .ANG.strom | ......... | G01B 11/25 |
| | | | | 382/141 |
| 2016/0114412 A1* | 4/2016 | Bosch | ............... | G01B 11/303 |
| | | | | 356/601 |
| 2017/0160080 A1 | 6/2017 | Lacaze | | |

FOREIGN PATENT DOCUMENTS

| | | | | | |
|---|---|---|---|---|---|
| CN | 2016075502 A | | 5/2016 | | |
| CN | 107843208 A | | 3/2018 | | |
| CN | 108534710 A | | 9/2018 | | |
| CN | 108981607 A | | 12/2018 | | |
| CN | 110220479 A | | 9/2019 | | |
| CN | 210070870 U | | 2/2020 | | |
| DE | 112011103090 T5 * | | 8/2013 | ........... | G01B 11/245 |

OTHER PUBLICATIONS

International Search Report and Written Opinion mailed Sep. 28, 2020, issued in corresponding International Patent Application No. PCT/CN2020/099442, filed Jun. 30, 2020, 9 pages.

* cited by examiner

NON-CONTACT KEY TOOTH PROFILE LEARNING METHOD AND SYSTEM

CROSS-REFERENCE TO RELATED APPLICATION

The present disclosure claims priority of Chinese patent application with the filing number 201910642404.3 filed on Jul. 16, 2019 with the Chinese Patent Office, and entitled "Non-contact key tooth profile learning method and system", the contents of which are incorporated herein by reference in entirety.

TECHNICAL FIELD

The present disclosure relates to the technical field of key duplication, in particular to a non-contact key tooth profile learning method and system.

BACKGROUND ART

The existing non-contact key tooth profile learning method uses a set of opposite-type photoelectric sensors as the tooth profile measurement scheme. This method has relatively high requirements for the assembly accuracy of the laser emitting end and the receiving end and the protection performance of the optical lens, and the tooth profile learning accuracy is also affected by the assembly and movement accuracy of the mechanical structure of the key duplicator, therefore, the existing key duplication method has the problems of poor universality, relatively high environmental requirement, complicated operation, and low efficiency.

SUMMARY

The purpose of the present disclosure includes providing a non-contact key tooth profile learning method and system to solve the problems of poor universality, relatively high environmental requirement, complicated operation, and low efficiency of the existing key tooth profile learning.

An embodiment of the present application provides a non-contact key tooth profile learning method, which includes the following steps: acquiring first profile point cloud data of a key by means of a line laser method; and processing the first profile point cloud data to obtain first 3D profile information.

Optionally, the step of acquiring first profile point cloud data of the key by means of the line laser method comprise: projecting a single beam of line laser on the surface of the key successively in multiple viewing angles for translational scanning, and receiving the reflected laser reflected from the surface of the key in the multiple viewing angles; obtaining profile data of the key in the multiple viewing angles according to the reflected laser in the multiple viewing angles; and making the first profile point cloud data according to the profile data in the multiple viewing angles, and the processing the first profile point cloud data to obtain first 3D profile information comprises: performing three-dimensional curved surface reconstruction according to the first profile point cloud data to obtain the first 3D profile information.

Optionally, after processing the first profile point cloud data to obtain first 3D profile information, the method comprises: performing machining according to the first 3D profile information or preset 3D profile information to obtain a new key; the non-contact key tooth profile learning method further comprises the steps: acquiring second profile point cloud data of the surface of the new key by means of the line laser method; processing the second profile point cloud data to obtain second 3D profile information; comparing the first 3D profile information or the preset 3D profile information with the second 3D profile information to obtain comparison difference; and calculating the machining accuracy of the key or compensating the machining error according to the comparison difference.

Optionally, the performing machining according to the first 3D profile information to obtain a new key further comprises: after the step of processing the first profile point cloud data to obtain the first 3D profile information, performing matching in a key standard database to obtain standard first 3D profile information corresponding to the first 3D profile information; and performing machining to obtain the new key according to the standard first 3D profile information.

Optionally, the non-contact key tooth profile learning method further comprises the steps: acquiring third profile point cloud data of the surface of the standard gauge block by means of the line laser method, wherein the standard gauge block has determined theoretical 3D profile information; processing the third point cloud data to obtain measured 3D profile information; comparing the theoretical 3D profile information with the measured 3D profile information to obtain a deviation; and compensating, according to the deviation, the error of image acquisition and/or image processing.

An embodiment of the present disclosure also provides a non-contact key tooth profile learning system, comprising an image acquisition module, which is configured to acquire first profile point cloud data of the surface of the key by means of a line laser method; and an image processing module, which is configured to process the first profile point cloud data to obtain first 3D profile information.

Optionally, the image acquisition module comprises:
a laser emitting unit and a laser receiving unit, which are configured to project a single beam of line laser on the surface of the key successively in multiple viewing angles for translational scanning, and receive the reflected laser reflected from the surface of the key in multiple viewing angles; an obtaining unit, which is configured to obtain profile data of the key in the multiple viewing angles according to the reflected laser in the multiple viewing angles; and a conversion unit, which is configured to make the first profile point cloud data according to the profile data in the multiple viewing angles, and the image processing module comprises: three-dimensional curved surface reconstruction unit, which is configured to perform three-dimensional curved surface reconstruction according to the first profile point cloud data to obtain the first 3D profile information.

Optionally, the non-contact key tooth profile learning system further comprises: a processing module, which is configured to performing machining to obtain the new key according to the first 3D profile information or preset 3D profile information, after processing the first profile point cloud data to obtain the first 3D profile information; the image acquisition module, which is configured to acquire the second profile point cloud data of the surface of the new key; and the image processing module, which is configured to process the second profile point cloud data to obtain second 3D profile information, and the non-contact key tooth profile learning system further comprises: a first comparison difference module, which is configured to compare the first 3D profile information or the preset 3D profile information with the second 3D profile information to obtain comparison difference; a calculation module, which is configured to calculate the machining accuracy of the key according to the comparison difference; and a first compensation module, which is configured to compensate the machining error according to the comparison difference.

Optionally, the non-contact key tooth profile learning system further comprises: a matching module, which is configured to perform matching in the key standard database to obtain the standard first 3D profile information corresponding to the first 3D profile information, after the step of processing the first profile point cloud data to obtain the first 3D profile information; and a machining module, which is further configured to perform machining to obtain the new key according to the standard first 3D profile information.

Optionally, third profile point cloud data of the surface of the standard gauge block is acquired through the image acquisition module, the standard gauge block having determined theoretical 3D profile information; the third profile point cloud data is processed through the image processing module to obtain measured 3D profile information, and the non-contact key tooth profile learning system further comprises: a second comparison difference module, which is configured to compare the theoretical 3D profile information with the measured 3D profile information to obtain a deviation; and a second compensation module, which is configured to compensate the error of image acquisition and/or image processing, according to the deviation.

BRIEF DESCRIPTION OF DRAWINGS

In order to illustrate technical solutions of the embodiments of the present disclosure more clearly, the drawings to be used in the embodiment will be briefly introduced below, it should be understood that the following drawings only show some embodiments of the present disclosure, and therefore should not be regarded as a limitation of the scope. And for those ordinarily skilled in the art, other relevant drawings can also be obtained in light of these drawings, without using any inventive efforts.

In the drawing: 1. image acquisition module; 2. image processing module; 3. machining module; 4. matching module; 5. first comparison difference module; 6. calculation module; 7. first compensation module; 8. second comparison difference module; 9. second compensation module; 11. laser emitting unit; 12. laser receiving unit.

DETAILED DESCRIPTION OF EMBODIMENTS

In order to make the objectives, technical solutions and advantages of the embodiments of the present disclosure clearer, the technical solutions in the embodiments of the present disclosure will be described clearly and completely below in conjunction with drawings in the embodiments of the present disclosure. Obviously, the described embodiments are a part of the embodiments of the present disclosure, rather than all of the embodiments. The components of the embodiments of the present disclosure generally described and shown in the drawings herein may be arranged and designed in various different configurations.

Therefore, the following detailed description of the embodiments of the present disclosure provided in the drawings is not intended to limit the claimed scope of the present disclosure, but only represents selected embodiments of the present disclosure. Based on the embodiments in the present disclosure, all other embodiments obtained by those ordinary skilled in the art without creative work shall fall within the protection scope of the present disclosure. It should be understood that the specific embodiments described herein are only used to explain the present disclosure, and not used to limit the present disclosure.

It should be noted that similar labels and letters represent similar items in the following drawing, therefore, once a certain item is defined in one drawing, it does not need to be further defined and explained in the subsequent drawings.

In addition, the terms "first", "second" and the like are merely used to distinguish between descriptions, and cannot be understood as indicating or implying importance in relativity.

In the description of the present disclosure, it should also be noted that, unless otherwise clearly specific and limited, terms such as "arrange" and "connect" and the like should be understood in a broad sense, for example, "connect" may be fixed connection, detachable connection, or integrated connection; may be mechanical connection or electrical connection; may be direct connection or indirect connection through intermediate medium, or may be the internal communication between two components. For those ordinary skilled in the art, the specific meanings of the above terms in the present disclosure can be understood according to the specific situation.

In use of the key of the present application, it is generally necessary to duplicate the key for backup; during the duplication of the key, the machining accuracy and the learning accuracy of the key tooth profile is related to the machining accuracy of the key duplicating machine, which directly determines the smoothness of key unlocking and the accuracy of the key duplication.

The non-contact key tooth profile learning method in the prior art usually adopts a set of opposite-type photoelectric sensors as the measurement scheme of key tooth profile. In this technical solution, the opposite-type photoelectric sensor is fixed on the machine body, with the laser emitting end and receiving end arranged opposite to each other, the key is clamped on the fixing device of fixture and located at the middle position of the paired photoelectric sensors, and the fixture table is controlled to approach the laser sensor in two directions, wherein when the receiving end does not receive the laser signal, the laser sensor sends out a signal to record the position of the key or the position of each tooth of the key. This method is only suitable for the externally-opened key, and only learns for keys known in the database, this method requires relatively high assembly accuracy of the laser emitting end and receiving end, and relatively high requirements for the protection performance of the optical lens, and the tooth profile learning accuracy is also affected by the assembly and movement accuracy of the mechanical structure of the key duplicating machine, therefore, the existing key duplication method has the problems of poor universality, relatively high environmental requirement, complicated operation, and low efficiency.

In view of the above technical problems, the present disclosure provides a non-contact key tooth profile learning method and system, and the present disclosure will be further described in detail below in conjunction with FIG. 1 to FIG. 5.

Figure 1:
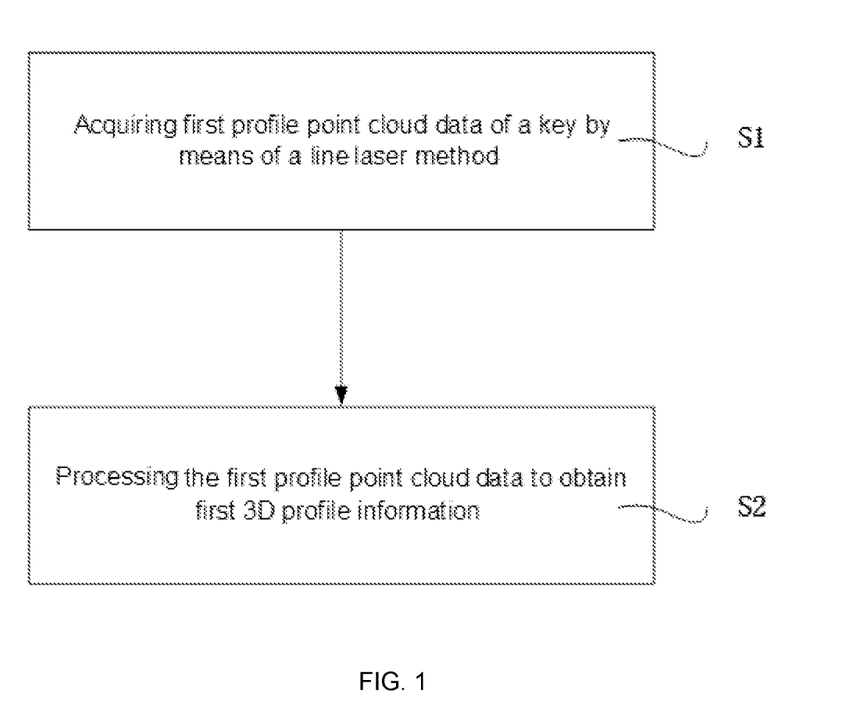
FIG. 1 is a flowchart of a non-contact key tooth profile learning method according to an embodiment of the present disclosure.

The embodiment of the present disclosure provides a non-contact key tooth profile learning method, as shown in FIG. 1, the method includes the following steps:

S1. acquiring first profile point cloud data of the surface of a key by means of a line laser method; and S2. processing the first profile point cloud data to obtain first 3D profile information.

In the above step S1, the line laser method comprises irradiating the surface of the key by emitting a line laser, wherein the surface of the key reflects the laser to the laser receiving end, and then the reflected laser received is converted into a signal to obtain the profile point cloud data information. The so-called "line laser scanning", which is relative to point laser scanning, has the principle in which a beam of line laser is emitted through a linear laser machine to the target to be scanned, a camera detects the reflection of the laser on the object through a fixed angle, and the information, such as the height, width and the shape, of the surface of the object is determined by the principle of the triangulation.

The first 3D profile information in the above step S2 includes but not limited to: key tooth profile feature data and key embryo feature data.

For example, the key tooth profile feature data can include the shape classification of the key, such as a straight-line type, flat tooth type, flat plate type, external sharp type, internal sharp type and the like, the key tooth profile feature data can also include the tooth position and tooth number grade difference of each tooth of each key. Optionally, the tooth profile code of the key can be obtained by calculation based on the above-mentioned first 3D profile information. The key embryo feature data may include the model of the key embryo and its corresponding size data.

Optionally, in this embodiment, a laser machine with a parameter of wavelength of 650 nm is used, but the measurement method involved is not limited to a laser in the 650 nm band, and lasers in other bands are also within the protection scope of the present disclosure. The line laser with emission parameter XXX is used to scan. Optionally, the line width of the above-mentioned line laser is less than 1 mm, but the measurement method involved is not limited to the case in which the line width is less than 1 mm, and measurement methods of other line widths are also within the protection scope of the present disclosure.

In this embodiment, the line laser method is used to acquire the first profile point cloud data on the surface of the key, wherein since the line laser will not affect the material of different keys, the line laser can scan keys of various materials, which has relatively high applicability. Compared with the traditional contact learning method in which probes are used, the non-contact key tooth profile learning method provided in the present disclosure does not require the installation of probes for tooth profile learning, therefore, for machining of different types of keys, there is no need to replace different probes, and the machining accuracy is not reduced due to probe wear, and it is not affected by the installation positions of probes. Therefore, the non-contact key tooth profile learning method of the present disclosure can be applied to machining of various types of keys, and the machining accuracy is higher. In the prior art, when images are acquired by a camera, the metal key may have a reflection phenomenon, which affects the acquisition accuracy of the camera; while in the present disclosure, the acquisition is performed by means of line laser and the reflected laser reflected from the surface of the key is received and processed, therefore, compared to the way that the camera acquires images in the prior art, the non-contact key tooth profile learning method provided by the present disclosure is not affected by the reflected light of the key, and therefore has higher accuracy. In the non-contact key tooth profile learning method provide in the present disclosure, the line laser method can be used to acquire point cloud profile information of the key from multiple viewing angles, therefore, the requirement of position accuracy of the key is relatively low. By acquiring the first profile point cloud data of the key and processing the first profile point cloud data of the key, the 3D profile information of the key can be obtained more accurately, so this method has relatively high learning accuracy, and machining, precision detection and calibration can be performed based on the 3D profile information of the key obtaining by acquiring and processing.

In one embodiment, the steps of acquiring first profile point cloud data of the key by means of the line laser method comprise:

S11. projecting a single beam of line laser on the surface of the key successively in multiple viewing angles for translational scanning, and receiving the reflected laser reflected from the surface of the key in the multiple viewing angles;

S12. obtaining profile data of the key in the multiple viewing angles according to the reflected laser in the multiple viewing angles;

S13. making the first profile point cloud data according to the profile data in the multiple viewing angles.

In the above, for the method used to make the first profile point cloud data, those ordinary skilled in the art can refer to the point cloud data generation algorithm in the prior art, which will not be repeated herein.

In one embodiment, the steps of processing the first profile point cloud data to obtain first 3D profile information comprises:

S21. performing three-dimensional curved surface reconstruction on the first profile point cloud data to obtain the first 3D profile information.

In the above S11, the step of projecting a single beam of line laser on the surface of the key successively in multiple viewing angles for translational scanning and receiving the reflected laser reflected from the surface of the key in multiple viewing angles comprises: projecting a single beam of line laser on the surface of the key for translational scanning, and then performing rotational scanning on the surface of the key, so that the surface of the key can be scanned from multiple viewing angles.

In this embodiment, the linear laser machine projects a single beam of line laser on the surface of the key and receives the reflected laser reflected from the surface of the key; the preset linear laser machine is controlled to emit the line laser to irradiate the surface of the key, and the linear laser machine is controlled to operate according to a preset action, so that the linear laser machine irradiates the entire surface of the key, wherein the preset action can be adjusted according to the shape classification of the key, and the model of the key embryo and its corresponding size data; the laser signal reflected from the key is received in real time; and the linear laser machine is controlled according to the preset action to rotate by 360° around the key and translate around the key, so that the linear laser machine can perform 360° scanning on the key. In other embodiments, the carrier of the key can also be controlled to translate and rotate to make the key itself rotate by 360°, and the above-mentioned carrier is generally a platform or fixture; the two-dimensional profile data obtained by the single beam of line laser emitted by the linear laser machine in different viewing angles is transferred to the same coordinate system through the rotation matrix, so as to obtain the first profile point cloud data in the same coordinate system of the key, and finally the curved surface reconstruction is performed on the first profile point cloud data, and the filtering processing is performed on tooth-shaped edge profile to obtain the first 3D profile information of the key. In the above, the specific method of performing filtering processing on the tooth-shaped edge profile can refer to the profile recognition related algorithm in the existing image processing technology, which will not be repeated herein.

Figure 2:
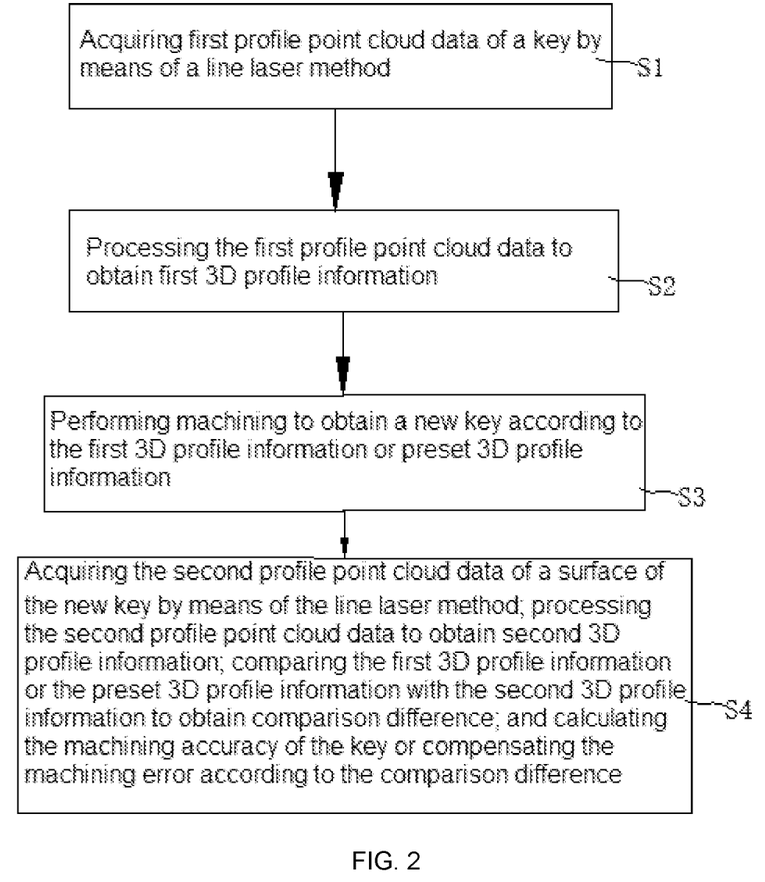
FIG. 2 is a flowchart of the non-contact key tooth profile learning method according to an embodiment of the present disclosure.

In one embodiment, as shown in FIG. 2, after processing the first profile point cloud data to obtain the first 3D profile information, the method comprises:

S3. performing machining to obtain a new key according to the first 3D profile information or preset 3D profile information.

In the above, the machining of the new key can be done on-site or remotely, which is very beneficial for the usage scenario where the spare key is not on-site after the original key is lost, wherein the user who has lost the key can scan the spare key that is far away and inconvenient to retrieve, with the help of others to obtain its first 3D profile information, and then look for a place where the new key can be machined in the vicinity of the lost place to obtain the new key, which greatly shortens the time required to retrieve the spare key and improves the convenience of the key duplication. Optionally, the new key can be obtained by machining through a 3D printing device that can machine metal parts, the 3D printing device can receive the first 3D profile information and/or preset 3D profile information on internet to realize real-time data reception and printing, which further improves the convenience of key duplication.

Optionally, the non-contact key tooth profile learning method provided in this embodiment further includes the following steps:

S4. acquiring the second profile point cloud data of the surface of the new key by means of a line laser method; processing the second profile point cloud data to obtain second 3D profile information; comparing the first 3D profile information or the preset 3D profile information with the second 3D profile information to obtain comparison difference; and calculating the machining accuracy of the key or compensating the machining error according to the comparison difference.

In step S4, the specific methods and steps of acquiring the second profile point cloud data of the surface of the new key by the means of a line laser method and processing the second profile point cloud data to obtain the second 3D profile information can be the same as the specific methods and steps of acquiring the first profile point cloud data of the surface of the original key by the means of a line laser method and processing the first profile point cloud data to obtain the first 3D profile information in steps S1 and S2, this not only makes the operation simple, but also reduce the error introduced by the method difference, which is conducive to subsequent comparison.

In the non-contact key tooth profile learning method provided in this embodiment, an instruction is generated based on the first 3D profile information of the key learned above, and a new key is obtained by machining according to the received instruction of the first 3D profile information. As the 3D profile information acquired by means of the line laser method is accurate, a new key with relatively higher accuracy comparable with the original key can be obtained by the machining. In other embodiments, the instruction may be also generated according to the known preset 3D profile information, and the new key may be obtained by machining according to received instruction of the preset 3D profile information, wherein since the preset 3D profile information is a certain value, the machined key is also more accurate. If the machined key is obtained by machining and duplicating according to the first 3D profile information, the comparison difference is obtained by comparing the second 3D profile information with the first 3D profile information of the new key, and according to the preset algorithm, the machining accuracy of the new key may be evaluated by the comparison difference to determine whether there is a problem in the machining process of the new key, wherein if the machining accuracy is within the allowable error range, the key is considered to be in the normal machining process; and if the machining accuracy exceeds the allowable error, a machining calibration is required, wherein the calibration step includes but not limited to compensating the machining error based on the comparison difference to improve machining accuracy. Optionally, the allowable error range is preset within a range of ±0.05 mm. If an instruction is sent to machine the key according to the preset 3D profile information, the second 3D profile information obtained from the machined key is compared with the preset 3D profile information, the machining accuracy of the new key is evaluated by the obtained comparison difference to determine whether there is a problem in the machining process of the new key; similarly, if the machining accuracy exceeds the allowable error, the machining calibration is required. The calibration step includes but not limited to compensating the machining error based on the comparison difference to improve machining accuracy.

Figure 3:
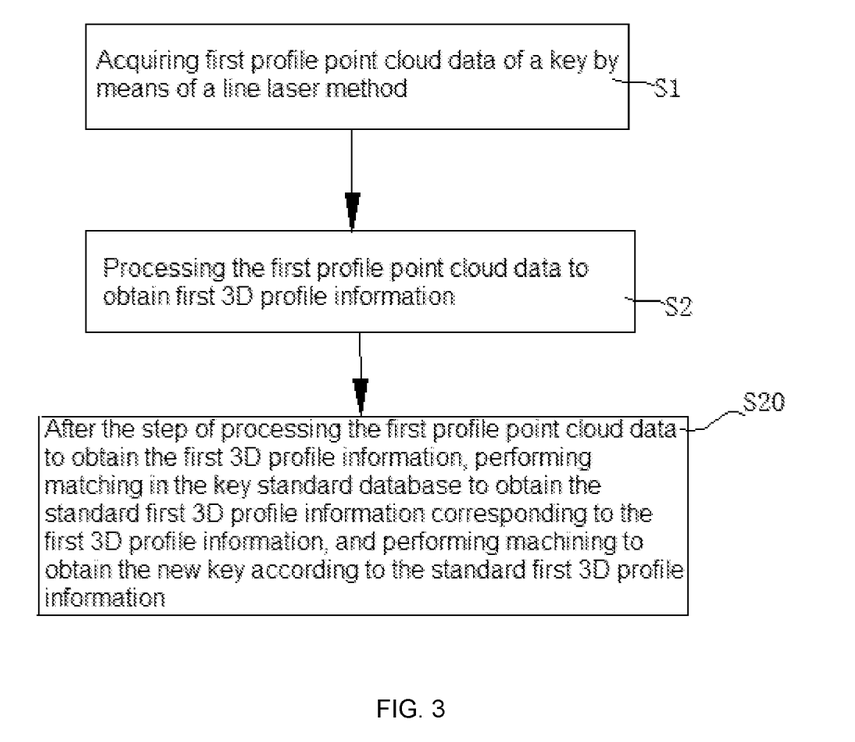
FIG. 3 is a flowchart of the non-contact key tooth profile learning method according to an embodiment of the present disclosure.

In one embodiment, as shown in FIG. 3, the performing machining to obtain the new key according to the first 3D profile information further includes:

S20. after the step of processing the first profile point cloud data to obtain the first 3D profile information, performing matching in the key standard database to obtain the standard first 3D profile information corresponding to the first 3D profile information, and performing machining to obtain the new key according to the standard first 3D profile information.

In this embodiment, the first 3D profile information of the key may be matched with the key standard database, and then a set of standard 3D profile information that is consistent with or closest to the first 3D profile information is found in the key standard database, and determined as the standard 3D profile information of the key, and then the key can be machined and duplicated according to standard 3D profile information, so as to obtain the key with higher machining accuracy. In the above, the above-mentioned standard 3D profile information may include the standard tooth profile feature data of the key and corresponding key embryo feature data.

Figure 4:
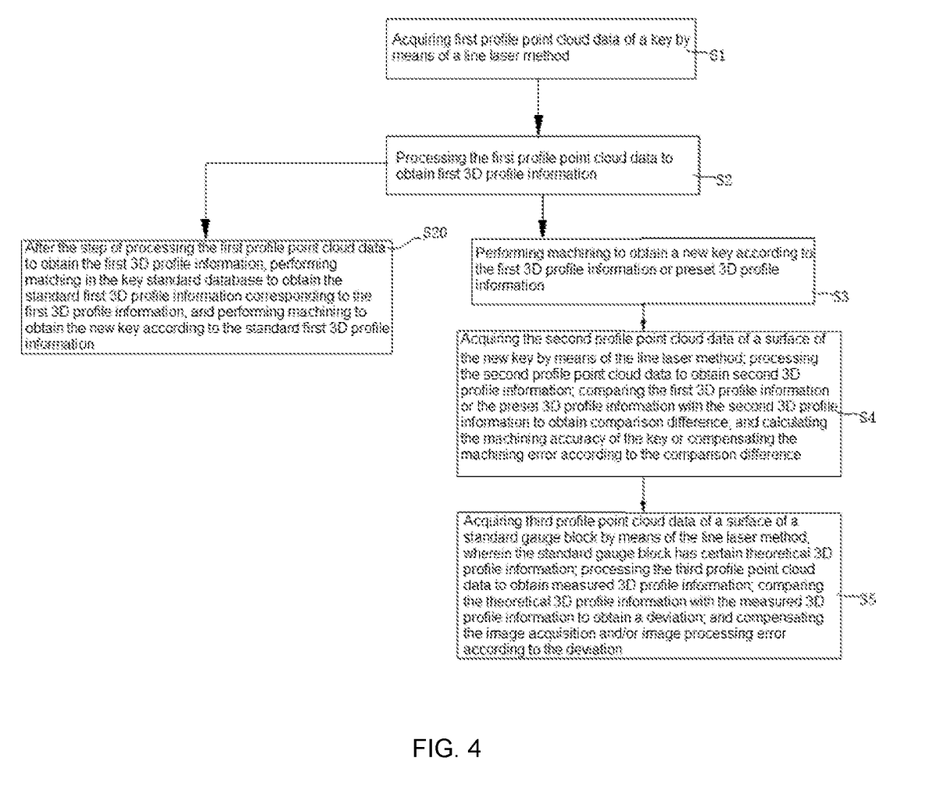
FIG. 4 is a flowchart of the non-contact key tooth profile learning method according to an embodiment of the present disclosure.

In one embodiment, as shown in FIG. 4, the non-contact key tooth profile learning method further includes the step:

S5. acquiring third profile point cloud data of the surface of the standard gauge block by means of a line laser method, wherein the standard gauge block has certain theoretical 3D profile information; processing the third profile point cloud data, to obtain measured 3D profile information; comparing the theoretical 3D profile information with the measured 3D profile information to obtain a deviation between them; according to the deviation between the theoretical 3D profile information and measured 3D profile information, compensating the image acquisition error and/or image processing error.

In the above, in this embodiment, an object with determined theoretical 3D profile information is used as the standard gauge block.

In this embodiment, the above-mentioned step S5 is executed after the step S4. In other embodiments, step S5 can also be executed before the step S1 or after the step S2. Since the standard gauge block has determined theoretical 3D profile information value, the image acquisition process is calibrated by using the standard gauge block to judge whether the process of acquiring the profile point cloud data by the laser method is accurate, wherein the obtained deviation is compensated to the error of the image acquisition according to the preset second compensation algorithm, which can improve the accuracy of image acquisition.

It is worth mentioning that the steps S1 and S2 described above can constitute a separate technical solution, which is a technical solution for obtaining the first 3D profile information of the key by learning the key tooth profile; steps S1, S2 and S3 can also constitute a separate technical solution, which is the technical solution of applying the first 3D profile information of the key obtained by learning the key tooth profile in steps S1 and S2 to key duplication; steps S1, S2, S3 and S4 can also constitute a separate technical solution, which is a technical solution for evaluating and compensating the machining accuracy of the key according to the duplicated key and the key tooth profile learning method; steps S1, S2, and S5 can also constitute a separate technical solution, which is the technical solution to learn the 3D profile information of the standard gauge block according to key tooth profile learning method for calibrating the error of the image acquisition and/or the error of image processing; and steps S1, S2, S3, S4, and S5 can also constitute a separate technical solution, which is a technical solution of applying the key tooth profile learning method to key machining, machining accuracy detection and calibration.

Figure 5:
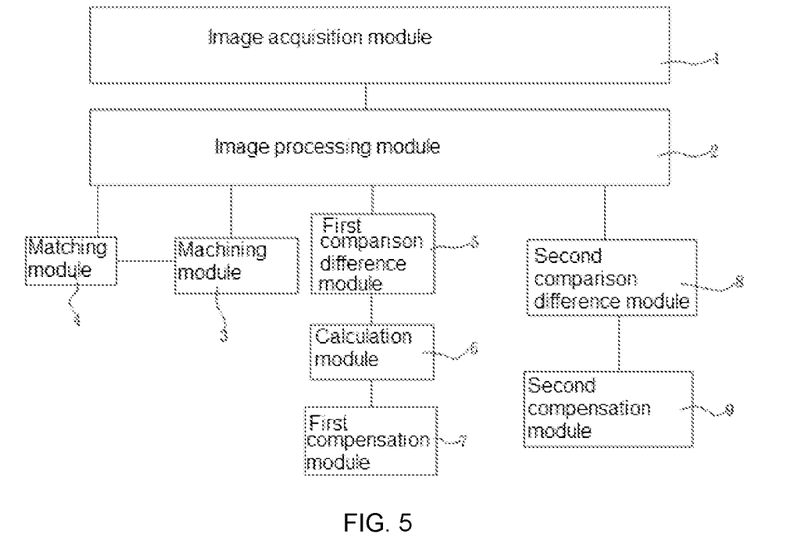
FIG. 5 is a structural schematic view of a non-contact key tooth profile learning system according to an embodiment of the present disclosure.

As shown in FIG. 5, the embodiment of the present disclosure also provides a non-contact key tooth profile learning system, including an image acquisition module 1 configured to acquire first profile point cloud data of the surface of the key by means of a line laser method; and an image processing module 2 configured to process the first profile point cloud data to obtain the first 3D profile information.

In this embodiment, one image acquisition module 1 is provided, including a wired laser emitting unit 11 and a laser receiving unit 12, wherein the line laser emitted by the line laser emitting unit 11 irradiates the surface of the key, and the surface of the key reflects the laser to the laser receiving unit 12. The image acquisition module 1 also includes an image integration unit, wherein the amplified reflected laser is transmitted to the image integration unit; and the image integration unit is connected with the image processing module 2, and the first profile point cloud data collected by the image acquisition module 1 is sent to the image processing module 2, so that the image processing module 2 can process the first profile point cloud data. In other embodiments, the image acquisition module 1 is not limited to be in number of one, multiple image acquisition modules may perform acquisition together to improve the accuracy and reliability of measurement, learning and calibration. In the above, the above-mentioned image integration unit may be a memory or the like, and the image processing module 2 may be a general processor, a single-chip microcomputer or the like.

In one embodiment, the image acquisition module 1 includes the laser emitting unit 11 and the laser receiving unit 12, which are configured to project a single beam of line laser on the surface of the key successively in multiple viewing angles for translational scanning, and receive the reflected laser reflected from the surface of the key in multiple viewing angles; an obtaining unit, which is configured to obtain profile data of the key in multiple viewing angles according to the reflected laser in multiple viewing angles; and a conversion unit, which is configured to make the first profile point cloud data according to the profile data in the multiple viewing angles; and the image processing module 2 comprises: three-dimensional curved surface reconstruction unit, which is configured to perform three-dimensional curved surface reconstruction on the first profile point cloud data to obtain the first 3D profile information.

Figure 6:
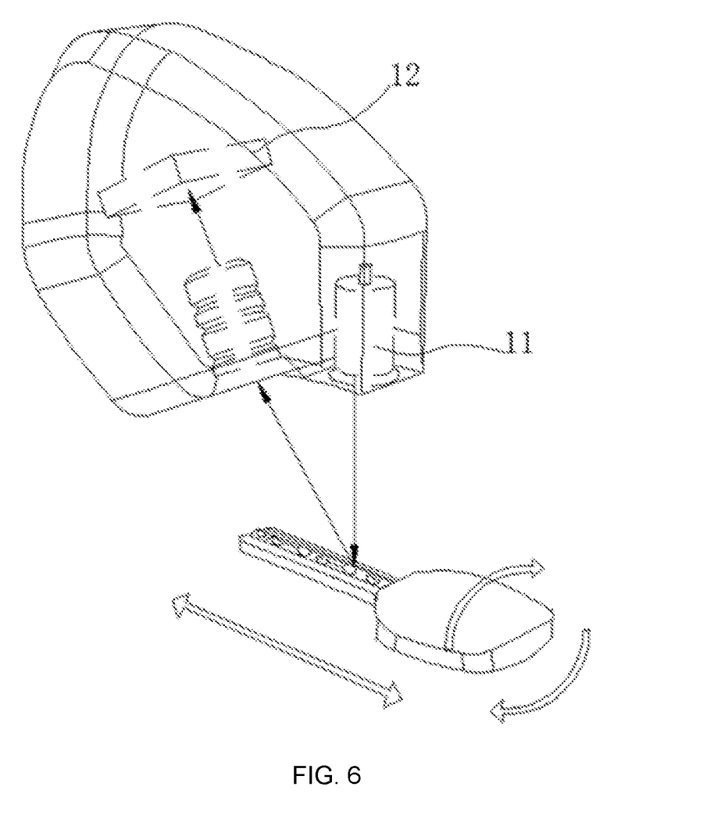
FIG. 6 is a structural schematic view of an image acquisition module of the non-contact key tooth profile learning system according to an embodiment of the present disclosure.

In this embodiment, as shown in FIG. 6, the angle between the line laser emitted by the laser emitting unit 11 and the surface of the key is 90°. In other embodiments, the angle between the line laser emitted by the laser emitting unit 11 and the surface of the key can also be other values. Because there are tooth profiles on the surface of the key, and the sizes and depths of the tooth profiles are different, when the line laser emitted by the laser emitting unit 11 irradiates the key sections with height differences, the signals of the reflected laser reflected from the different heights of the key are different, the laser receiving unit 12 receives a surface profile line varying with the height, the image acquisition module 1 is preset with a height algorithm, and the height algorithm is the simplest when the angle is 90°, then according to the surface profile line received by the laser receiving unit 12, the sectional height information of the key in the current scanning can be calculated. The image acquisition module 1 and the key move relatively to each other, the laser emitting unit 11 continuously emits line laser to different positions on the surface of the key for scanning, and the laser receiving unit 12 continuously receives multiple surface profile lines varying with the height, the height information of multiple sections of the key is calculated and obtained according to multiple surface profile lines, and then the profile data of the key is spliced according to all the height information.

Optionally, the aforementioned non-contact key tooth profile learning system further includes a translation and rotation module, which is configured to control the image acquisition module 1 and/or the carrier of the key to run according to a preset action, so that the image acquisition module 1 irradiates all the surfaces of the key, and receives the laser signal reflected from the key in real time. In this embodiment, the translation and rotation module is configured to control the image acquisition module 1 according to a preset action to rotate by 360° around the key and translate around the key, so that the image acquisition module 1 performs 360° scanning on the key. In other embodiments, the carrier of the key can also be controlled to translate and rotate, so that the key itself can rotate by 360°, so that the linear image acquisition module 1 obtains the first profile information of the key of each angle.

In an embodiment, the aforementioned non-contact key tooth profile learning system further includes: a machining module 3 configured to perform machining according to the first 3D profile information or preset 3D profile information to obtain the new key, after the first 3D profile information is obtained by processing the first profile point cloud data; the second profile point cloud data of the surface of the new key is acquired by the image acquisition module 1; the second profile point cloud data is processed by the image processing module 2 to obtain the second 3D profile information; the non-contact key tooth profile learning system also includes: a first comparison difference module 5, which is configured to compare the first 3D profile information or the preset 3D profile information with the second 3D profile information to obtain the comparison difference; a calculation module 6, which is configured to calculate the machining accuracy of the key according to comparison difference; and the first compensation module 7, which is configured to compensate the machining error according to the comparison difference.

In this embodiment, the aforementioned first 3D profile information or preset 3D profile information of the key learned is accurately sent as an instruction and sent to the machining module 3, the machining module 3 performs machining according to the received first 3D profile information or preset 3D profile information to obtain the new key; because the line laser method is not limited by the materials, the first 3D profile information acquired is accurate, and the new key obtained by machining is relatively accurate comparable with the original key; the first comparison difference module 5 is preset with a first comparison difference algorithm, and compares the first 3D profile information or preset 3D profile information with the second 3D profile information according to the first comparison difference algorithm to obtain a comparison difference; the calculation module 6 is preset with a calculation algorithm and calculates the machining accuracy of the key according to the calculation algorithm; the first compensation module 7 is preset with a compensation algorithm to compensate the error of the machining module 3, improving the machining accuracy of the machining module 3.

In an embodiment, the aforementioned non-contact key tooth profile learning system also includes: a matching module 4, which is configured to perform matching in the key standard database to obtain the standard first 3D profile information corresponding to the first 3D profile information, after the step of processing the first profile point cloud data to obtain the first 3D profile information; and the processing module 3, which is configured to perform machining to obtain a new key according to the standard first 3D profile information.

In this embodiment, the key standard tooth profile information and key standard embryo information are pre-stored in the key standard database, and the matching module 4 is configured to match the first 3D profile information of the key with the key standard database, to find a set of standard 3D profile information consistent with or closest to the first 3D profile information in the key standard database, and confirm it as the standard 3D profile information of the key, and then the key is machined and duplicated according to the standard 3D profile information to obtain a key with higher machining accuracy, improving machining accuracy of the key.

In an embodiment, the image acquisition module 1 is configured to acquire the third profile point cloud data of the surface of the standard gauge block, wherein the standard gauge block has determined theoretical 3D profile information; and the image processing module 2 is configured to process the third profile point cloud data to obtain the measured 3D profile information.

In an embodiment, the aforementioned non-contact key tooth profile learning system further includes: a second comparison difference module 8 configured to compare theoretical 3D profile information and measured 3D profile information to obtain a deviation; and a second compensation module 9 configured to compensate the error of the image acquisition and/or the error of image processing according to the deviation.

In this embodiment, the second comparison difference module 8 is preset with a second comparison difference algorithm, and the deviation is obtained according to the theoretical D profile information and the measured D profile information; and the second compensation module 9 is configured to calculate the acquisition accuracy of the acquisition module and perform compensation on the image acquisition module 1, according to the deviation and based on the second compensation algorithm preset therein.

Since the non-contact key tooth profile learning system provided by the embodiments of the present disclosure is configured to implement the non-contact key tooth profile learning method provided by the embodiments of the present disclosure, wherein the principles, details and technical effects can refer to the corresponding parts in the method embodiments, therefore they will not be repeated here.

In summary, the present disclosure provides a non-contact key tooth profile learning method and system, wherein the beneficial effects brought by the non-contact key tooth profile learning method include that the line laser is not affected by the key materials, enabling relatively high applicability, the key tooth profile information acquired is accurate, achieving high learning accuracy, and the 3D profile information obtained by acquiring and processing is used for machining, precision detection and calibration.

The above are only the preferred embodiments of the present disclosure, and does not limit the scope of the patent of the present disclosure, any equivalent structures or equivalent process transformations made by using the content of the description and drawings of the present disclosure, directly or indirectly applied in other related technical fields, are equally included in the scope of the patent protection of the present disclosure.

INDUSTRIAL APPLICABILITY

The present disclosure provides a non-contact key tooth profile learning method and system, which solve the problems of the poor universality, relatively high environment requirement, complicated operation, and low efficient of the existing key tooth profile leaning.

What is claimed is:
1. A non-contact key tooth profile learning method, comprising following steps:
acquiring first profile point cloud data of a key by a line laser method; and
processing the first profile point cloud data to obtain first 3D profile information;
wherein the step of acquiring first profile point cloud data of the key by the line laser method comprises:
projecting a single beam of line laser on a surface of the key successively in multiple viewing angles for translational scanning, and receiving reflected laser reflected from the surface of the key in the multiple viewing angles;
obtaining profile data of the key in the multiple viewing angles according to the reflected laser in the multiple viewing angles; and
obtaining the first profile point cloud data according to the profile data in the multiple viewing angles, and the step of processing the first profile point cloud data to obtain first 3D profile information comprises:
performing three-dimensional curved surface reconstruction on the first profile point cloud data to obtain the first 3D profile information;
wherein the step of projecting a single beam of line laser on the surface of the key successively in multiple viewing angles for translational scanning and receiving reflected laser reflected from the surface of the key in the multiple viewing angles comprises:
a linear laser machine projecting the line laser on the surface of the key and receiving the reflected laser reflected from the surface of the key;
making the line laser irradiate an entire surface of the key by controlling the linear laser machine, which is preset, to emit the line laser to irradiate the surface of the key and controlling the linear laser machine to operate according to a preset action; and
receiving a laser signal reflected from the key in real time;
wherein the step of making the line laser irradiate an entire surface of the key by controlling the linear laser machine which is preset to emit the line laser to irradiate the surface of the key and controlling the linear laser machine to operate according to a preset action comprises:
making the linear laser machine perform 360° scanning on the key by controlling the linear laser machine to rotate by 360° around the key and translate around the key; or
controlling a carrier of the key to translate and rotate to make the key itself rotate by 360°.

2. The non-contact key tooth profile learning method according to claim 1, wherein after processing the first profile point cloud data to obtain first 3D profile information, the method comprises:
performing machining to obtain a new key according to the first 3D profile information or preset 3D profile information, and
the method further comprises steps:
acquiring second profile point cloud data of a surface of the new key by the line laser method;
processing the second profile point cloud data to obtain second 3D profile information;
comparing the first 3D profile information or the preset 3D profile information with the second 3D profile information to obtain a comparison difference; and
calculating machining accuracy of the key or compensating a machining error, according to the comparison difference.

3. The non-contact key tooth profile learning method according to claim 2, wherein the performing machining to obtain a new key according to the first 3D profile information further comprises:
performing matching in the key standard database to obtain standard first 3D profile information corresponding to the first 3D profile information, after the step of processing the first profile point cloud data to obtain the first 3D profile information; and
performing machining to obtain the new key according to the standard first 3D profile information.

4. The non-contact key tooth profile learning method according to claim 3, wherein the step of performing matching in the key standard database to obtain standard first 3D profile information corresponding to the first 3D profile information after the step of processing the first profile point cloud data to obtain the first 3D profile information comprises:
matching the first 3D profile information of the key with the key standard database, to find in the key standard database a set of standard 3D profile information consistent with or closest to the first 3D profile information, and confirming the consistent or closest set of standard 3D profile information as the standard 3D profile information of the key.

5. The non-contact key tooth profile learning method according to claim 4, wherein the method further comprises steps:
acquiring third profile point cloud data of a surface of a standard gauge block by the line laser method, wherein the standard gauge block has determined theoretical 3D profile information;
processing the third profile point cloud data, to obtain measured 3D profile information;
comparing the theoretical 3D profile information with the measured 3D profile information to obtain a deviation; and
compensating an image acquisition and/or image processing error according to the deviation.

6. The non-contact key tooth profile learning method according to claim 1, wherein after processing the first profile point cloud data to obtain first 3D profile information, the method comprises:
performing machining to obtain a new key according to the first 3D profile information or preset 3D profile information, and
the method further comprises steps:
acquiring second profile point cloud data of a surface of the new key by the line laser method;
processing the second profile point cloud data to obtain second 3D profile information;
comparing the first 3D profile information or the preset 3D profile information with the second 3D profile information to obtain a comparison difference; and
calculating machining accuracy of the key or compensating a machining error, according to the comparison difference.

7. The non-contact key tooth profile learning method according to claim 1, wherein after processing the first profile point cloud data to obtain first 3D profile information, the method comprises:
performing machining to obtain a new key according to the first 3D profile information or preset 3D profile information, and
the method further comprises steps:
acquiring second profile point cloud data of a surface of the new key by the line laser method;
processing the second profile point cloud data to obtain second 3D profile information;
comparing the first 3D profile information or the preset 3D profile information with the second 3D profile information to obtain a comparison difference; and
calculating machining accuracy of the key or compensating a machining error, according to the comparison difference.

8. The non-contact key tooth profile learning method according to claim 1, wherein the method further comprises steps:
acquiring third profile point cloud data of a surface of a standard gauge block by the line laser method, wherein the standard gauge block has determined theoretical 3D profile information;
processing the third profile point cloud data, to obtain measured 3D profile information;

comparing the theoretical 3D profile information with the measured 3D profile information to obtain a deviation; and compensating an image acquisition and/or image processing error according to the deviation.

9. The non-contact key tooth profile learning method according to claim 1, wherein the method further comprises steps:

acquiring third profile point cloud data of a surface of a standard gauge block by the line laser method, wherein the standard gauge block has determined theoretical 3D profile information;

processing the third profile point cloud data, to obtain measured 3D profile information;

comparing the theoretical 3D profile information with the measured 3D profile information to obtain a deviation; and compensating an image acquisition and/or image processing error according to the deviation.

10. The non-contact key tooth profile learning method according to claim 1, wherein the method further comprises steps:

acquiring third profile point cloud data of a surface of a standard gauge block by the line laser method, wherein the standard gauge block has determined theoretical 3D profile information;

processing the third profile point cloud data, to obtain measured 3D profile information;

comparing the theoretical 3D profile information with the measured 3D profile information to obtain a deviation; and compensating an image acquisition and/or image processing error according to the deviation.

11. A non-contact key tooth profile learning system, comprising:

an image acquisition module, which is configured to acquire first profile point cloud data of a surface of a key by a line laser method; and an image processing module, which is configured to process the first profile point cloud data to obtain first 3D profile information;

wherein the image acquisition module comprises:

an image integration unit, which is configured to receive amplified reflected laser, wherein the image integration unit is connected to the image processing module, and is configured to send the first profile point cloud data acquired by the image acquisition module to the image processing module;

wherein the image acquisition module further comprises:

a laser emitting unit and a laser receiving unit, which are configured to project a single beam of line laser on the surface of the key successively in multiple viewing angles for translational scanning, and receive reflected laser reflected from the surface of the key in the multiple viewing angles;

an obtaining unit, which is configured to obtain profile data of the key in the multiple viewing angles according to the reflected laser in the multiple viewing angles; and a conversion unit, which is configured to make the first profile point cloud data according to the profile data in the multiple viewing angles, and the image processing module comprises:

a three-dimensional curved surface reconstruction unit, which is configured to perform three-dimensional curved surface reconstruction according to the first profile point cloud data to obtain the first 3D profile information.

12. The non-contact key tooth profile learning system according to claim 11, wherein an angle between the line laser emitted by the laser emitting unit and the surface of the key is 90°.

13. The non-contact key tooth profile learning system according to claim 12, further comprising:

a machining module, which is configured to perform machining according to the first 3D profile information or preset 3D profile information to obtain a new key, after the first 3D profile information is obtained by processing the first profile point cloud data;

the image acquisition module, which is configured to acquire second profile point cloud data of a surface of the new key; and the image processing module, which is configured to process the second profile point cloud data to obtain second 3D profile information, and the non-contact key tooth profile learning system further comprises:

a first comparison difference module, which is configured to compare the first 3D profile information or the preset 3D profile information with the second 3D profile information to obtain a comparison difference;

a calculation module, which is configured to calculate machining accuracy of the key according to the comparison difference; and a first compensation module, which is configured to compensate a machining error according to the comparison difference.

14. The non-contact key tooth profile learning system according to claim 13, further comprising:

a matching module, which is configured to perform matching in the key standard database to obtain standard first 3D profile information corresponding to the first 3D profile information, after the step of processing the first profile point cloud data to obtain the first 3D profile information; and the machining module, which is further configured to perform machining to obtain the new key according to the standard first 3D profile information.

15. The non-contact key tooth profile learning system according to claim 14, wherein the image acquisition module is configured to acquire third profile point cloud data of a surface of a standard gauge block, wherein the standard gauge block has determined theoretical 3D profile information;

the image processing module is configured to processing the third profile point cloud data to obtain measured 3D profile information; and the non-contact key tooth profile learning system further comprises:

a second comparison difference module, which is configured to compare the theoretical 3D profile information with the measured 3D profile information to obtain a deviation; and a second compensation module, which is configured to compensate an image acquisition and/or image processing error according to the deviation.

* * * * *